United States Patent [19]

Medema et al.

[11] Patent Number: 4,566,374

[45] Date of Patent: Jan. 28, 1986

[54] COFFEE MAKER

[75] Inventors: Pieter W. Medema; Elmo I. Benjamins, both of Groningen, Netherlands

[73] Assignee: U.S. Philips Corporation, New York, N.Y.

[21] Appl. No.: 648,201

[22] Filed: Sep. 7, 1984

[30] Foreign Application Priority Data

Apr. 2, 1984 [NL] Netherlands .......................... 8401032

[51] Int. Cl.$^4$ ............................................... A47J 31/00
[52] U.S. Cl. ......................................... 99/281; 99/285; 362/32
[58] Field of Search ................. 99/285, 295, 280, 281, 99/282, 283; 350/96.1, 96.28; 362/32; 134/113; 426/433

[56] References Cited

U.S. PATENT DOCUMENTS 3,479,949 11/1969 Reynolds ............................. 99/295
3,693,535 9/1972 Abel ..................................... 99/285
3,819,928 6/1974 Noba ................................... 350/96.1

Primary Examiner—Robert W. Jenkins
Attorney, Agent, or Firm—Rolf E. Schneider

[57] ABSTRACT

A coffee maker comprises a housing and a water tank supported by the housing. Included are a filter device and a flow heater having a heating element for heating water from the water tank and feeding the same to the filter device, the flow heater being positioned within the housing. A thermal cut-out is associated with the flow heater, and an on/off indicator lamp is situated adjacent the thermal cut-out. Provision is made for actuating the thermal cut-out and includes an actuator button having an opening and an actuating arm made of a transparent material and serving as a light guide when the indicator lamp is on, one end of the actuating arm being located near the indicator lamp and the other end of the actuating arm projecting through the opening in the actuator button.

2 Claims, 2 Drawing Figures

COFFEE MAKER

This invention relates to a coffee maker comprising a housing, a water tank, a filter device, a flow heater including a heating element, an actuating button by means of which a thermal cut-out for the heating element is operable via means, and an on/off-indicator lamp.

Such a coffee maker is disclosed in published Dutch application No. 8200176.

The present invention aims at simplifying the construction of such a coffee maker.

According to the invention the coffee maker is characterized in that the means comprises an actuating arm which is made of a transparent material and which functions as a light guide, one end of the arm being situated near the lamp which is arranged inside the housing and the other end projecting visibly from the housing.

As a result of this arrangement the flow heater unit, including the wiring and the indicator lamp can be assembled and tested separately and can subsequently be mounted in the appliance in a simple and inexpensive manner. Finally, the actuator-arm/light-guide and the actuating button can be mounted.

A preferred embodiment is characterized in that the visible end of the light guide projects from an opening in the actuating button.

A further embodiment is characterized in that the actuating button is situated on the upper side of the housing.

The invention will now be described in more detail, with reference to the accompanying drawings, in which.

Figure 1:
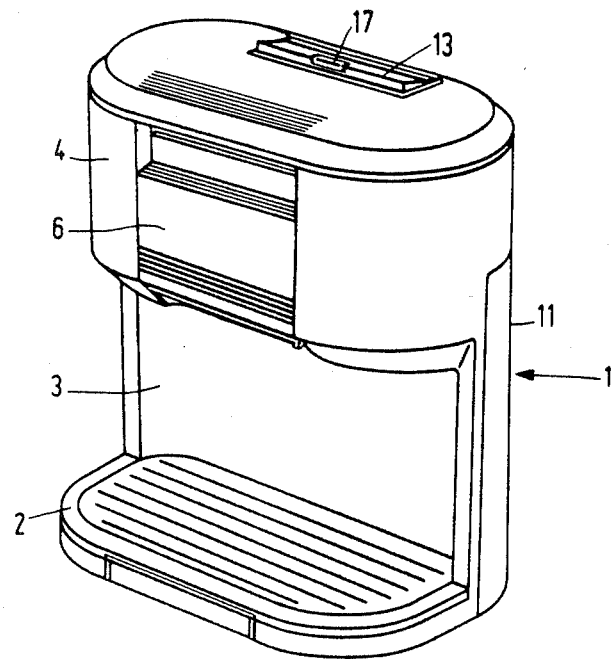
FIG. 1 is a perspective view of a coffee maker in accordance with the invention.
Figure 2:
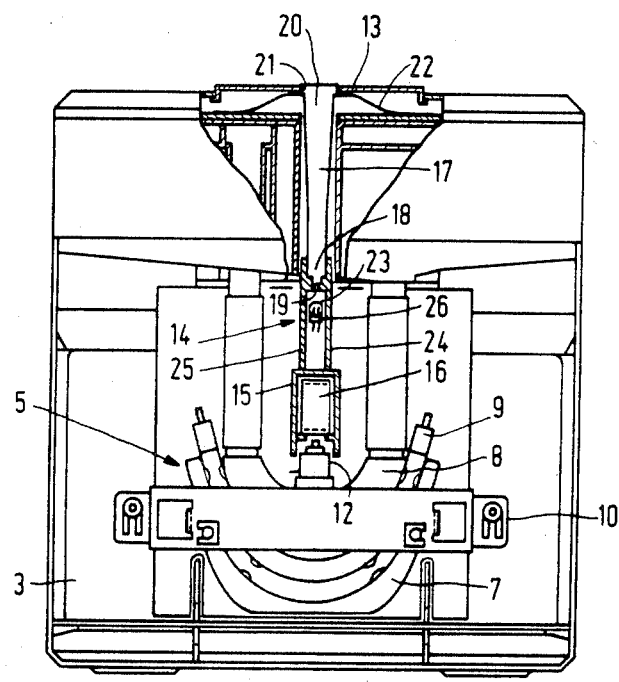
FIG. 2 is a rear view on an enlarged scale, part sectional view of the coffee maker shown in FIG. 1, from which the rear cover has been removed.

The coffee maker comprises a housing having a horizontal base 2, wall 3 which extends perpendicularly to said base, which housing supports a water tank 4. A flow heater 5 is secured to the rear of the appliance and serves for heating the water and feeding it from the water tank to a filter device 6. The flow heater 5 comprises an aluminium casting 7 in which a water duct 8 is formed and in which a heating element 9 is mounted.

The flow heater is secured to the rear side of the upper housing wall 3 by means of a bracket 10. The flow heater compartment is closed by a rear cover 11.

A thermal cut-out 12 is secured to or otherwise associated with the casting 7 so as to be in proper thermally conductive contact with this casting. The thermal cut-out is actuated by means of an actuator button 13, which is situated on the upper side of the housing 1. Means 14 is arranged between the actuator button and the thermal cut-out. This means comprises an actuating portion 15, a U-shaped blade spring 16 arranged in the actuating portion 15, an actuating arm 17 whose lower end portion 18 is clamped in apertured recess 19 in the actuating portion 15 and whose upper end 20 projects through an opening 21 in the actuating button 13, and a blade spring 22 for resiliently supporting the means 14 relative to the housing 1. The U-shaped blade spring 16, whose limbs extend perpendicularly to the plane of the drawing, provides the direct contact with the thermal cut-out 12. The blade spring 16 functions as a force-limiter for the thermal cut-out. The actuating portion 15 mainly comprises a U-shaped section. The on/off indicator lamp 23 is arranged on a support 26 between the limbs 24, 25 of the actuating portion 15 beneath the recess 19, which support 26 is connected to the housing 1, but is not shown in more detail. In accordance with the invention the actuating arm 17 is made of a transparent material and functions as a light guide for the on/off indicator lamp 23.

We claim:

1. A coffee maker comprising a housing; a water tank supported by the housing; a filter device; a flow heater including a heating element for heating water from the water tank and feeding the same to the filter device, said flow heater being positioned within the housing; a thermal cut-out associated with the flow heater; an on/off indicator lamp situated adjacent the thermal cut-out; and means for actuating the thermal cut-out, said actuating means including an actuator button having an opening and an actuating arm made of a transparent material and serving as a light guide when the indicator lamp is on, one end of said actuating arm being located near the indicator lamp and the other end of said actuating arm projecting through the opening in the actuator button.

2. A coffee maker according to claim 1, in which the actuator button is arranged on the upper side of the housing.

* * * * *